United States Patent
Svokos et al.

[15] 3,673,172
[45] June 27, 1972

[54] 1,4-DIPHENYL-3,6-[DIMERCAPTO OR EPI (DITHIA OR TETRATHIA)]2,5-PIPERAZINEDIONES

[72] Inventors: Steve George Svokos, Westwood, N.J.; Robert Bruce Angier, Pearl River, N.Y.

[73] Assignee: American Cyanamid Company, Stamford, Conn.

[22] Filed: April 14, 1970

[21] Appl. No.: 28,525

Related U.S. Application Data

[63] Continuation-in-part of Ser. No. 833,147, June 13, 1969, Pat. No. 3,560,483.

[52] U.S. Cl..............260/239.3 B, 260/243 R, 260/268 DK, 424/250
[51] Int. Cl.........................................................C07d 93/36
[58] Field of Search...............260/268 DK, 268 PA, 239.3 B, 260/243 R

[56] References Cited

UNITED STATES PATENTS

| | | | |
|---|---|---|---|
| 3,560,483 | 2/1971 | Svokos | 260/268 DK |
| 3,562,253 | 2/1971 | Trown | 260/268 DK |
| 3,595,963 | 4/1971 | Mordock et al. | 260/239.3 |

OTHER PUBLICATIONS

Meyer, Ber. Vol. 10, p. 1967 (1877).

*Primary Examiner*—Donald G. Daus
*Attorney*—Edward A. Conroy, Jr.

[57] ABSTRACT

This disclosure describes substituted 1,4-diphenyl-3,6-dimercapto-2,5-piperazinediones and substituted 1,4-diphenyl-3,6-epi(dithia or tetrathia)-2,5-piperazinediones useful as antifungal agents.

10 Claims, No Drawings

1,4-DIPHENYL-3,6-[DIMERCAPTO OR EPI (DITHIA OR TETRATHIA)]2,5-PIPERAZINEDIONES

CROSS-REFERENCE TO RELATED APPLICATION

This application is a continuation-in-part of our co-pending application Ser. No. 833,147, filed June 13, 1969, now U.S. Pat. No. 3,560,483.

BRIEF SUMMARY OF THE INVENTION

This invention relates to new organic compounds and, more particularly, is concerned with novel substituted 1,4-di-phenyl-3,6-dimercapto-2,5-piperazinediones and novel substituted 1,4-diphenyl-3,6-epi(dithia or tetrathia)-2,5-piperazinediones and with methods of preparing these compounds. The novel compounds of the present invention may be represented by the following general formulas:

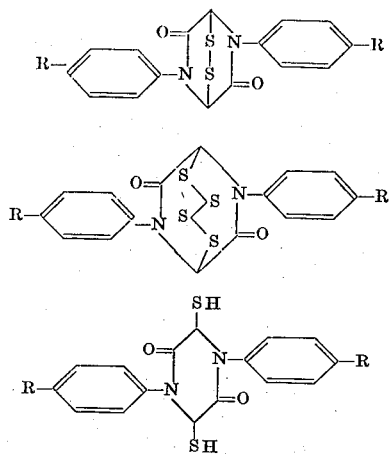

wherein R is hydrogen, lower alkyl, or lower alkoxy. Suitable lower alkyl and lower alkoxy groups contemplated by the present invention are those having up to four carbon atoms such as, for example, methyl, ethyl, n-propyl, isobutyl, methoxy, ethoxy, isopropoxy, sec-butoxy, etc. Typical compounds of the present invention represented by the above general formulas are, for example, 1,4-di(p-isopropoxyphenyl)-3,6-dimercapto-2,5-piperazinedione, 1,4-di(p-sec-butoxyphenyl)-3,6-dimercapto-2,5-piperazinedione, 1,4-di(p-ethylphenyl)-3,6-dimercapto-2,5-piperazinedione, 1,4-di(p-n-butylphenyl)-3,6-dimercapto-2,5-piperazinedione, 1,4-di(p-tert-butylphenyl)-3,6-dimercapto-2,5-piperazinedione, 1,4-di(p-n-propoxyphenyl)-3,6-epidithia-2,5-piperazinedione, 1,4-di(p-isobutoxyphenyl)-3,6-epidithia-2,5-piperazinedione, 1,4-di(p-tolyl)-3,6-epidithia-2,5-piperazinedione, 1,4-di(p-isopropylphenyl)-3,6-epidithia-2,5-piperazinedione, 1,4-di(p-sec-butylphenyl)-3,6-epidithia-2,5-piperazinedione, 1,4-di(p-ethoxyphenyl)-3,6-epitetrathia-2,5-piperazinedione, 1,4-di(p-n-butoxyphenyl)-3,6-epitetrathia-2,5-piperazinedione, 1,4-di(p-tert-butoxyphenyl)-3,6-epitetrathia-2,5-piperazinedione, 1,4-di(p-n-propylphenyl)-3,6-epitetrathia-2,5-piperazinedione and 1,4-di(p-isobutylphenyl)-3,6-epitetrathia-2,5-piperazinedione.

DETAILED DESCRIPTION OF THE INVENTION

The novel compounds of the present invention are generally obtainable as white or yellow crystalline materials having characteristic melting points and absorption spectra and appreciable solubility in organic solvents such as dimethylformamide, ethanol, isopropanol, and chloroform. However, they are generally insoluble in water and petroleum ether.

The novel compounds of the present invention may be readily prepared from substituted N-phenylglycines as illustrated in the following reaction scheme:

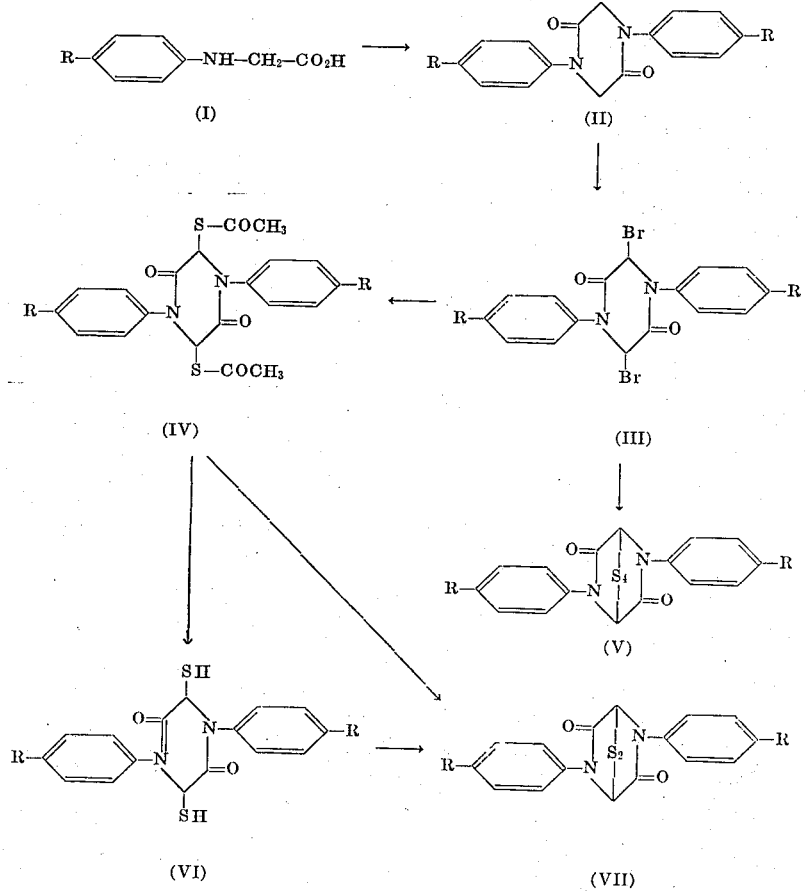

wherein R is as hereinabove defined. In accordance with the above reaction scheme, an appropriately substituted N-phenylglycine (I) is dimerized to form the corresponding substituted 1,4-diphenyl-2,5-piperazinedione (II) by the methods of P. J. Meyer, Ber. 10, 1967 (1877) and J. Halberkann, Ber. 54, 1161 (1921). The substituted 1,4-diphenyl-2,5-piperazinedione (II) is brominated at the 3 and 6 positions using bromine and a suitable solvent such as chlorobenzene or o-dichlorobenzene. Heating the reaction mixture to about 90°–160° C. facilitates the bromination and the use of lower temperatures necessitates longer reaction times. The brominated product (III) can be isolated by diluting the reaction solution with petroleum ether. Treatment of the 1,4-diphenyl-3,6-dibromo-2,5-piperazinedione (III) with an excess of anhydrous sodium tetrasulfide affords the corresponding 3,6-epitetrathia product (V). In this reaction, an intimate mixture of anhydrous sodium tetrasulfide and the 1,4-diphenyl-3,6-dibromo-2,5-piperazinedione (III) is dissolved in anhydrous lower alkanol or dimethylformamide at room temperature (0°–50° C.) for a period of a few hours whereupon the 1,4-diphenyl-3,6-epitetrathia-2,5-piperazinedione (V) precipitates.

Treatment of the 2,5-piperazinedione-3,6-dibromide (III) with an excess of thiolacetic acid yields the corresponding 3,6-dithioacetate product (IV). In this reaction, the 3,6-dibromide (III) is added slowly to a cooled (0°–10° C.) solution of thiolacetic acid and sodium methoxide in methanol. Elevated temperatures must be avoided in order to obtain high yields of the cis form of the 3,6-dithioacetate product (IV), which is the only isomer that undergoes subsequent transformation to the 3,6-disulfide (VII), either directly or through the corresponding cis 3,6-dimercapto derivatives (VI). Elevated temperatures result in the production of the trans isomers of the corresponding 3,6-dithioacetates (IV). The product (IV) separates from the reaction mixture and is collected by filtration, washed with water, and dried. The so obtained 3,6-dithioacetates (IV) are converted to the corresponding 3,6-dithiols (VI) by treatment with hydrazine hydrate. In this reaction, the hydrazine hydrate is added slowly at room temperature to a slurry of sodium acetate and the 3,6-dithioacetate (IV) in absolute ethanol. Ordinarily, a period of about 15–45 minutes is sufficient to effect the conversion and dilution of the reaction mixture with water, followed by acidification, precipitates the desired 3,6-dithiol (VI).

The substituted 1,4-diphenyl-3,6-di(acetylthio)-2,5-piperazinediones (IV) are converted to the corresponding 3,6-epidithia derivatives (VII) by treatment with hydroxylamine. In this reaction, a mixture of hydroxylamine hydrochloride, sodium acetate, and the 3,6-dithioacetate (IV) in absolute ethanol is stirred at room temperature for about an hour or so. The 1,4-diphenyl-3,6-epidithia-2,5-piperazinedione product (VII) is removed by filtration, washed with water, and dried. Oxidation of a substituted 1,4-diphenyl-3,6-dimercapto-2,5-piperazinedione (VI) with potassium ferricyanide also affords the corresponding 3,6-epidithia derivatives (VII). In this reaction, an aqueous solution of the 3,6-dithiol (VI) and potassium carbonate is added dropwise at room temperature to an aqueous solution of potassium ferricyanide over a period of 5–10 minutes. The 1,4-diphenyl-3,6-epidithia-2,5-piperazinedione product (VII) precipitates from the reaction solution and is collected by filtration and dried.

The novel compounds of the present invention are biologically active and have been found to possess broad-spectrum antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is than added to 9 ml. of warm sterile nutrient agar capable of supporting growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. Appropriate calibration of these observations permits the quantitative calculation of the minimal inhibitory concentration (expressed in micrograms per milliliter) causing complete inhibition of growth for each test compound. By way of illustration, the minimal inhibitory concentrations of typical compounds of the present invention against various test organisms is set forth in Table I below:

TABLE I (1) 1,4-diphenyl-3,6-epitetrathia-2,5-piperazinedione
(2) 1,4-diphenyl-3,6-epidithia-2,5-piperazinedione
(3) 1,4-diphenyl-3,6-dimercapto-2,5-piperazinedione
(4) 1,4-di(p-methoxyphenyl)-3,6-epidithia-2,5-piperazinedione
(5) 1,4-di(p-methoxyphenyl)-3,6-dimercapto-2,5-piperazinedione

|  | Minimal Inhibitory Conc. mcg./ml. | | | | |
| --- | --- | --- | --- | --- | --- |
|  | (1) | (2) | (3) | (4) | (5) |
| Candida albicans 300 (E83) | 2.5 | 5 | 2.5 | 2.5 | 5 |
| Cryptococcus neoformans SP (E138) | 2.5 | 1 | 1 | 1 | 1 |
| Microsporum canis ATCC 10214 | 2.5 | 0.5 | 0.25 | 0.5 | 0.25 |
| Microsporum gypseum ATCC 14683 | 2.5 | 1 | 1 | 1 | 1 |
| Trichophyton tonsurans NIH 662 (E10) | 2.5 | 0.5 | 0.25 | 1 | 0.25 |
| Trichophyton mentagrophytes (E11) | 2.5 | 1 | 1 | 1 | 0.25 |
| Trichophyton rubrum (E97) | 2.5 | 0.5 | 1 | 0.5 | 0.25 |

As antifungals, the novel compounds of this invention may be administered orally or parenterally in the usual pharmaceutical forms, or possibly in the diet, and/or as compositions of active ingredient in an edible carrier. Such compositions may include tablets, scored or unscored, or hard of soft shell capsules. Excipients may include lactose, starch, buffers, disintegrating agents, lubricants, homogenizing agents, and the like. Oral and parenteral compositions may include similar agents and also preservatives, emulsifiers, surfactants, stabilizers and the like in solutions, suspensions, syryps, elixirs, etc. in either aqueous or non-aqueous systems. Additional excipients might include sweeteners, flavorings, colorings, or perfumes. Topical preparations, it is expected, will prove particularly useful. Such compositions would be designed for administration to subjects exposed to, or infected with sensitive fungi for either treatment or prophylaxis and may include, in addition to the foregoing, ointments, creams, emulsions, unguents, salves, emolients, sprays, washes or the like. In addition, compounds of this invention may be used in the form of solutions, suspensions, emulsions, washes, powders, dusts, mists, soaps, sprays, aerosols, drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection or contamination with sensitive fungi. Painting, spraying, immersion or other means of effecting contact may be applied.

The invention will be described in greater detail in conjunction with the following specific examples.

EXAMPLE 1

Preparation of 1,4-diphenyl-3,6-dibromo-2,5-piperazinedione

A suspension of 2.66 g. (10 mmoles) of 1,4-diphenyl-2,5-piperazinedione in 50 ml. of o-dichlorobenzene at 155° C., was treated with bromine (1.0 ml., 20 mmoles) in a dropwise fashion. On cooling the solution and diluting with an equal volume of petroleum ether there was obtained 3.1 g. (73 percent) of tan crystals with m.p. 180°–184° C. A 1.0 g. sample was recrystallized from hot toluene to give 0.49 g. of pale yellow crystals with m.p. 206°–210° C.

EXAMPLE 2

Preparation of 1,4-diphenyl-3,6-epitetrathia-2,5-piperazinedione

To 60 ml. of anhydrous ethanol at 0° C. was added 6.37 g. (15 mmoles) of 1,4-diphenyl-3,6-dibromo-2,5-piperazinedione. The suspension was then treated, in a dropwise manner, with 5.22 g. (30 mmoles) of anhydrous sodium tetrasulfide in 120 ml. of dry ethanol. The reaction mixture was stirred at 0° C. for 1.5 hours. Filtration of the reaction mixture yielded, after washing the collected product with water, ethanol, diethyl ether and petroleum ether, 4.8 g. (83 percent) of pale yellow crystals with m.p. 190°–195° C. Recrystallization was accomplished by dissolving 4.5 g. of product in 45 ml. of warm dimethylformamide (steam bath) and then adding water to turbidity. On chilling there was obtained 1.8 g. (31 percent) of crystalline product with m.p. 237°–238° C.

EXAMPLE 3

Preparation of 1,4-diphenyl-3,6-di(acetylthio)-2,5-piperazine-dione

Thiolacetic acid (5.86 g., 77 mmoles) was added to a solution of sodium methoxide (3.78 g., 70 mmoles) in 200 ml. of methanol. The clear yellow solution was cooled in an ice bath and 1,4-diphenyl-3,6-dibromo-2,5-piperazinedione (14.87 g., 35 mmoles) was added over a 10 minute period, maintaining the temperature between 6° and 8° C. After 30 minutes the white solid was collected by filtration, washed with water and dried in vacuo over phosphorus pentoxide. The yield of 1,4-diphenyl-3,6-di(acetylthio)-2,5-piperazinedione was 12.6 g. (87 percent), m.p. 228°–235° C.

EXAMPLE 4

Preparation of 1,4-diphenyl-3,6-dimercapto-2,5-piperazinedione

Hydrazine hydrate (100 mg., 2 mmoles) was added dropwise, at room temperature over a 5 minute period, to a slurry of sodium acetate (328 mg., 4 mmoles) and 1,4-diphenyl-3,6-di-(acetylthio)-2,5-piperazinedione (207 mg., 0.5 mmole) in 5 ml. of absolute ethanol. The almost clear solution was stirred at room temperature for 30 minutes. The small amount of solid present was removed by filtration and discarded. The filtrate was diluted with 30 ml. of water and acidified by the cautious addition of concentrated hydrochloric acid. The white solid which precipitated was collected by filtration, washed with water and dried in vacuo over phosphorous pentoxide. The yield of 1,4-diphenyl-3,6-dimercapto-2,5-piperazinedione was 121 mg. (77 percent), m.p. 180°–185° C.

EXAMPLE 5

Preparation of 1,4-diphenyl-3,6-epidithia-2,5-piperazinedione

A mixture of hydroxylamine hydrochloride (278 mg., 4 mmoles), sodium acetate (328 mg., 4 mmoles) and 1,4-diphenyl-3,6-di(acetylthio)-2,5-piperazinedione (414 mg., 1 mmole) in 10 ml. of absolute ethanol was stirred at room temperature for 30 minutes. The white crystalline material was collected by filtration, washed with water, and dried in vacuo over phosphorus pentoxide. The yield of crude 1,4-diphenyl-3,6-epidithia-2,5-piperazinedione was 160 mg. (48 percent). An analytical sample was obtained by crystallization from acetonitrile, m.p. 245°–247° C.

EXAMPLE 6

Preparation of 1,4-diphenyl-3,6-epidithia-2,5-piperazinedione

A solution of 165 mg. (0.0005 mole) of 1,4-diphenyl-3,6-dimercapto-2,5-piperazinedione in 15 ml. of water containing 1 g. of potassium carbonate was added dropwise at room temperature with stirring to 7.5 ml. of an aqueous solution of 0.6 g. (0.0018 mole) of $K_3Fe(CN)_6$ during 5–10 minutes. The solid which separated was collected and dried and identified as 1,4-diphenyl-3,6-epidithia-2,5-piperazinedione by spectral (infrared; nuclear magnetic resonance) and thin-layer chromatographic comparisons with a sample of this product prepared as in Example 5; yield 75 mg. (46 percent).

EXAMPLE 7

Preparation of 1,4-di(p-methoxyphenyl)-3,6-dibromo-2,5-piperazinedione 1,4-Di(p-methoxyphenyl)-2,5-piperazinedione was brominated as in Example 1 to give the title compound with a melting point of 220°–225° C.

EXAMPLE 8

Preparation of 1,4-di(p-methoxyphenyl)-3,6-di(acetylthio)-2,5-piperazinedione 1,4-Di(p-methoxyphenyl)-3,6-dibromo-2,5-piperazinedione was treated exactly as in Example 3 to give the title compound; m.p. 246°–248° C.

EXAMPLE 9

Preparation of 1,4-di(p-methoxyphenyl)-3,6-dimercapto-2,5-piperazinedione 1,4-Di(p-methoxyphenyl)-3,6-di(acetylthio)-2,5-piperazinedione was treated as in Example 4 to give the title compound; m.p. 213°–215° C.

EXAMPLE 10

Preparation of 1,4-di(p-methoxyphenyl)-3,6-epidithia-2,5-piperazinedione 1,4-Di(p-methoxyphenyl)-3,6-di(acetylthio)-2,5-piperazinedione was treated as in Example 5 to give the title compound; m.p. 240°–243° C.

We claim:
1. A compound selected from the group consisting of those of the formulas:

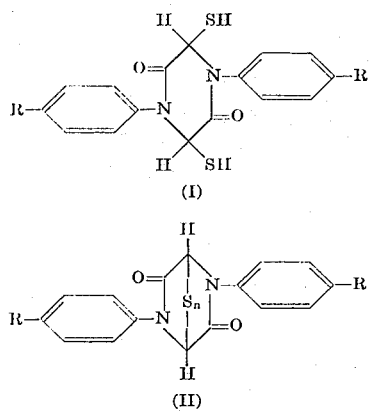

wherein R is selected from the group consisting of hydrogen, lower alkyl and lower alkoxy and $n$ is an integer selected from the group consisting of 2 and 4.

2. The compound according to claim 1, formula (I), wherein R is hydrogen; 1,4-diphenyl-3,6-dimercapto-2,5-piperazinedione.

3. The compound according to claim 1, formula (I), wherein R is methyl; 1,4-di(p-tolyl)-3,6-dimercapto-2,5-piperazinedione.

4. The compound according to claim 1, formula (I), wherein R is methoxy; 1,4-di(p-methoxyphenyl)-3,6-dimercapto-2,5-piperazinedione.

5. The compound according to claim 1, formula (II), wherein R is hydrogen and $n$ is 2; 1,4-diphenyl-3,6-epidithia-2,5-piperazinedione.

6. The compound according to claim 1, formula (II), wherein R is methyl and $n$ is 2; 1,4-di(p-tolyl)-3,6-epidithia-2,5-piperazinedione.

7. The compound according to claim 1, formula (II), wherein R is methoxy and $n$ is 2; 1,4-di(p-methoxphenyl)-3,6-epidithia-2,5-piperazinedione.

8. The compound according to claim 1, formula (II), wherein R is hydrogen and $n$ is 4; 1,4-diphenyl-3,6-epitetrathia-2,5-piperazinedione.

9. The compound according to claim 1, formula (II), wherein R is methyl and $n$ is 4; 1,4-di(p-tolyl)-3,6-epitetrathia-2,5-piperazinedione.

10. The compound according to claim 1, formula (II), wherein R is methoxy and $n$ is 4; 1,4-di(p-methoxyphenyl)-3,6-epitetrathia-2,5-piperazinedione.

* * * * *